United States Patent
Stoner et al.

(10) Patent No.: US 7,246,773 B2
(45) Date of Patent: Jul. 24, 2007

(54) LOW POWER, PULSED, ELECTRO-THERMAL ICE PROTECTION SYSTEM

(75) Inventors: Paul Stoner, North Canton, OH (US); Daniel P. Christy, Akron, OH (US); David B. Sweet, Canal Fulton, OH (US)

(73) Assignee: Goodrich Coporation, Charlotte, NC (US)

( * ) Notice: Subject to any disclaimer, the term of this patent is extended or adjusted under 35 U.S.C. 154(b) by 189 days.

(21) Appl. No.: 10/840,736

(22) Filed: May 6, 2004

(65) Prior Publication Data

US 2007/0075188 A1   Apr. 5, 2007

(51) Int. Cl.
*B64D 15/14* (2006.01)
(52) U.S. Cl. ................................ 244/134 D
(58) Field of Classification Search ............ 244/134 D, 244/134 R
See application file for complete search history.

(56) References Cited

U.S. PATENT DOCUMENTS

| | | | | |
|---|---|---|---|---|
| 3,420,746 | A | * | 1/1969 | Schultz et al. .......... 244/134 D |
| 3,800,121 | A | * | 3/1974 | Dean et al. .................. 219/202 |
| 3,885,758 | A | * | 5/1975 | Croswell, Jr. ................ 244/219 |
| 4,021,008 | A | * | 5/1977 | Eichenauer ............. 244/134 D |
| 4,036,457 | A | | 7/1977 | Volkner et al. |
| 5,098,037 | A | | 3/1992 | Leffel et al. |
| 5,248,116 | A | | 9/1993 | Rauckhorst |
| 5,351,918 | A | * | 10/1994 | Giamati et al. ......... 244/134 D |
| 5,361,183 | A | | 11/1994 | Wiese |
| 5,427,332 | A | | 6/1995 | Rauckhorst, III et al. |
| 5,475,204 | A | | 12/1995 | Giamati et al. |
| 5,657,951 | A | | 8/1997 | Giamati |
| 5,657,952 | A | * | 8/1997 | Goldberg ................ 244/134 R |
| 5,947,418 | A | * | 9/1999 | Bessiere et al. ......... 244/134 D |
| 5,971,323 | A | * | 10/1999 | Rauch et al. ............ 244/134 D |
| 6,027,075 | A | | 2/2000 | Petrenko |
| 6,237,874 | B1 | | 5/2001 | Rutherford et al. |
| 6,279,856 | B1 | | 8/2001 | Rutherford et al. |
| 6,427,946 | B1 | | 8/2002 | Petrenko |

(Continued)

FOREIGN PATENT DOCUMENTS

WO    WO 00/33614    6/2000

(Continued)

*Primary Examiner*—Tien Dinh
(74) *Attorney, Agent, or Firm*—Womble Carlyle

(57) ABSTRACT

An electro-thermal ice protection system for an airfoil comprises: a metal foil heater including an integral parting strip, the metal foil heater configurable to cover at least a portion of a leading edge of the airfoil with the integral parting strip disposed along an air-stagnation zone of the leading edge; and a controller coupled electrically to the metal foil heater for controlling electrical energy from a power source to the metal foil of the heater in accordance with a pulse duty-cycle and for controlling power to the parting strip of the heater to maintain the air-stagnation zone virtually free of ice formation. A method of making an exemplary metal foil heater for use in ice protection of an airfoil comprises the steps of: preparing a sheet of Titanium foil in a rectangular shape having a length substantially greater than a width thereof for covering at least a portion of the leading edge of the airfoil; applying a layer of Nickel material over an area along each width edge of the Titanium foil; applying a layer of Copper material over the Nickel layer along each width edge of the Titanium foil; and attaching conductor wires to the Copper layers at each width edge.

23 Claims, 7 Drawing Sheets

U.S. PATENT DOCUMENTS

| | | |
|---|---|---|
| 6,576,115 B2 | 6/2003 | Petrenko |
| 6,639,381 B2 * | 10/2003 | Tamura et al. ............... 320/103 |
| 2002/0175152 A1 | 11/2002 | Petrenko |
| 2003/0155467 A1 * | 8/2003 | Petrenko ................. 244/134 R |

FOREIGN PATENT DOCUMENTS

| | | |
|---|---|---|
| WO | WO 03/62056 | 7/2003 |
| WO | WO 03/069955 A1 | 8/2003 |

* cited by examiner

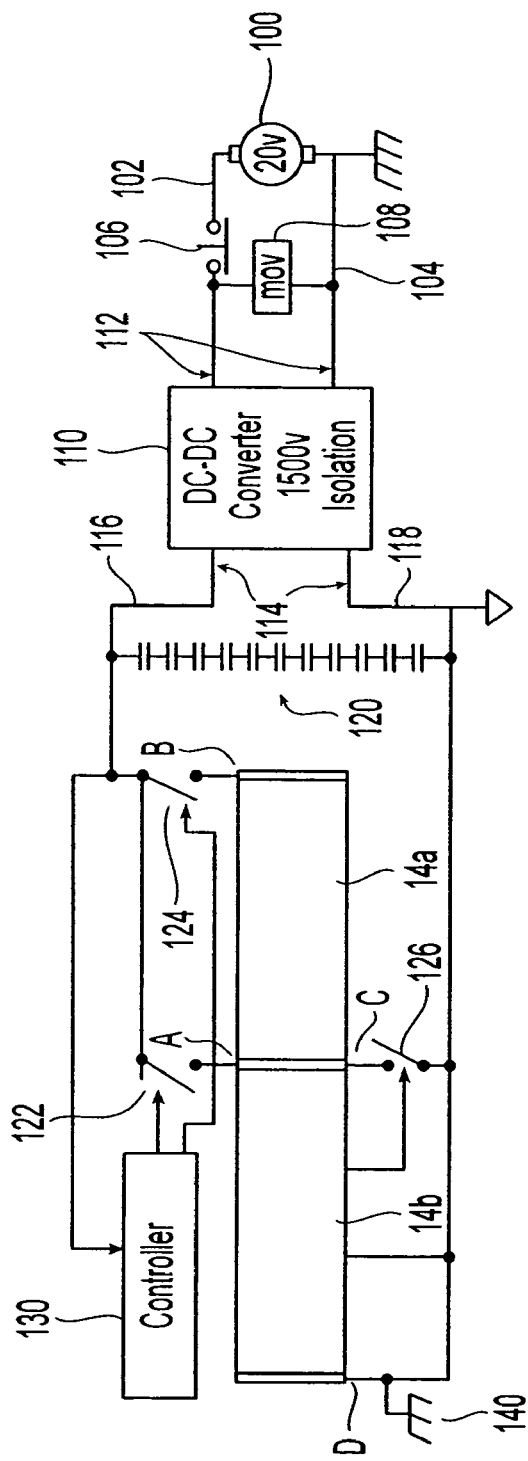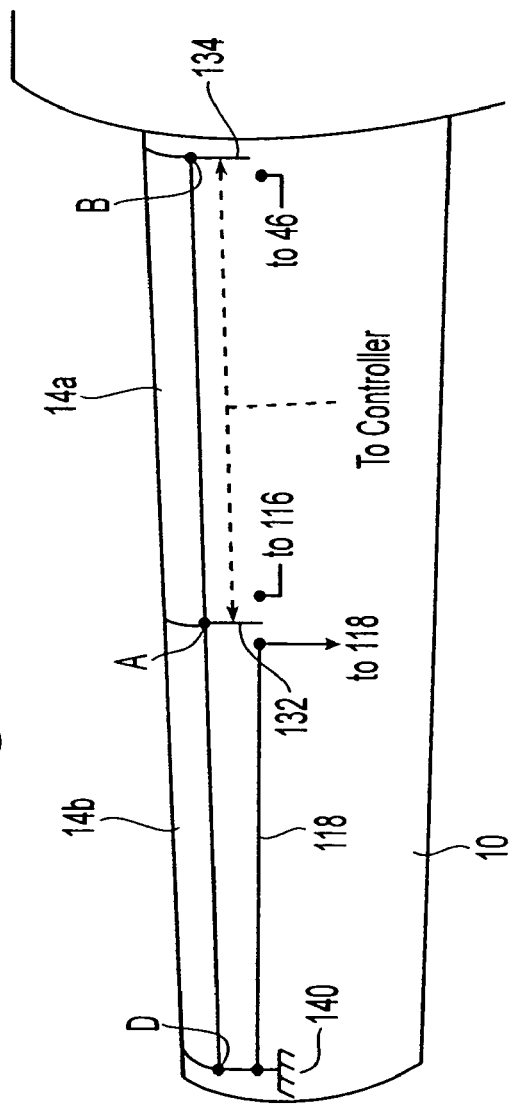
Fig. 7
Fig. 8

LOW POWER, PULSED, ELECTRO-THERMAL ICE PROTECTION SYSTEM

CROSS REFERENCE TO RELATED PENDING APPLICATIONS

U.S. patent application Ser. No. 10/364,438, entitled "System and Method For Modifying An Ice-To-object Interface", filed Feb. 11, 2003, published Aug. 21, 2003 under Publication No. US 2003/0155467, and claiming the benefit of U.S. Provisional Applications: 60/356,476 filed Feb. 11, 2002; 60/398,004 filed Jul. 23, 2002; and 60/404,872 filed Aug. 21, 2002.

BACKGROUND OF THE INVENTION

The present invention is related to electro-thermal ice protection systems for aero structures, in general, and more particularly, to a system comprising a metal foil heater, including an integral parting strip, configurable to cover at least a portion of a leading edge of an airfoil; and a controller for controlling heating energy to the metal foil of the heater in accordance with a pulse duty-cycle and for controlling heating energy to the parting strip to maintain an air-stagnation zone of the leading edge virtually free of ice formation.

Currently proposed electro-thermal de-icing or anti-icing products for leading edge ice protection of aero surfaces generally utilize heating elements or electrodes disposed at a leading edge surface of the aero structure in the form of a serpentine or interdigitated finger area grid to deliver heating power to ice which may be formed thereon. One such proposed electro-thermal ice protection product operates in an electro-chemical mode in which energy is delivered through capacitive coupling to the accreted ice by high frequency (HF) audio electro-chemical heating. Through an electrolysis reaction, gases are generated at the ice-surface interface which tend to affect the ice adhesive bond and separate the ice from the surface. When disposed on an airfoil under flight conditions in a wind tunnel, it was found that the electrolysis reaction was highly dependent on temperature, i.e. much more active as the temperature rose. Accordingly, heat energy tended to concentrate at a spot or spots in the heater grid where the temperature rose and the warmer the spot the more energy was drawn to it creating an avalanche effect. So, a spot on the heater grid where the electro-chemical reaction first started ended up drawing heat energy away from the rest of the grid to the point where ice could no longer be removed from the colder surfaces.

In addition, it was found that the electro-chemical heating method fails to perform at low temperatures, like below −20° C., for example, because the ice which is a protonic semiconductor is not conductive enough at these temperatures to allow significant power to be imparted at voltage levels that are consistent with safe aero design practice as dictated by the U.S. FAA regulations and FAA advisory circular bulletins such as AC 25.981, for example.

Further, conductive heater electrodes have been proposed to be disposed on, but insulated from, the aero surfaces to be protected from ice in parallel finger patterns which ran the length of the heater. In one serpentine pattern design, each finger had a width dimension of 0.020 inches or 20 mils with a separation distance from adjacent fingers of 20 mils, and a thickness dimension of 0.004 inches or 4 mils. However, this bare metal surface heater arrangement was found not to be structurally sound when tested under airfoil flight conditions, especially under rain erosion and particulate abrasion conditions. Any layer of material disposed over the heater grid for protection against rain erosion and particulate abrasion conditions will cause heat losses which will impose additional heating power requirements for ice protection. Generally, power supply systems on-board the aero structure can not afford to provide such ice protection power without affecting the power requirements to other systems.

A similar ice protection system is proposed in the U.S. Pat. No. 6,027,075, entitled "Systems and Methods For Modifying Ice Adhesion Strength", and issued to Victor Petrenko on Feb. 22, 2000. Petrenko recognized that there is a liquid like layer (LLL) at the ice interface between the ice layer and aero structure which is a major factor in the ice adhesion strength. Petrenko realized that the LLL functions as a wetting surface which substantially increases the effective contact area between surfaces. The Petrenko system comprises a first electrode connected to the aero surface, preferably in the form of a grid, an electrically insulating layer disposed over the first electrode, and a second electrode formed over the first electrode in a similar grid as the first electrode. In operation, when ice is detected on the surface, a DC voltage is applied across the first and second electrode grids of sufficient magnitude to decrease the ice adhesion strength of the LLL and facilitate ice removal by the wind slipstream across the aero surface.

Since the Petrenko system proposes a similar grid of electrodes either in a serpentine or interdigitated design which couple energy into the ice layer accreted on an aero structure to loosen the bond between the ice and aero surface, it will suffer similar structural and power requirement drawbacks in an aero structure flight environment as described for the AC electro-chemical heating system above.

The present invention overcomes the aforementioned drawbacks of the present electro-thermal ice protection systems and offers an electro-thermal ice protection system rugged enough to withstand exposure to an aero structure operational environment, and capable of shedding ice from an aero surface at safe voltages and substantially reduced power levels, and before the ice accretes to a dangerous thickness level.

SUMMARY OF THE INVENTION

In accordance with one aspect of the present invention, an electro-thermal ice protection system for an airfoil comprises: a metal foil heater including an integral parting strip, the metal foil heater configurable to cover at least a portion of a leading edge of the airfoil with the integral parting strip disposed along an air-stagnation zone of the leading edge; and a controller coupled electrically to the metal foil heater for controlling electrical energy from a power source to the metal foil of the heater in accordance with a pulse duty-cycle and for controlling power to the parting strip of the heater to maintain the air-stagnation zone virtually free of ice formation.

In accordance with another aspect of the present invention, a method of making a metal foil heater for use in ice protection of an airfoil comprises the steps of: preparing a sheet of Titanium foil in a rectangular shape having a length substantially greater than a width thereof for covering at least a portion of a leading edge of the airfoil; applying a layer of Nickel material over an area along each width edge of the Titanium foil; applying a layer of Copper material over the Nickel layer along each width edge of the Titanium foil; and attaching conductor wires to the Copper layers at each width edge.

In accordance with yet another aspect of the present invention, an ice protection system for an airfoil comprises: at least one metal foil heater covering at least a portion of a leading edge of the airfoil, the at least one metal foil heater coupled at a region through a conductor to a conductive structure of the airfoil for distributing electrical energy of a lightning strike from the region through the conductor to the conductive structure; and a converter powered by a power source for supplying electrical heating energy to the at least one metal foil heater over source and return lines which are electrically isolated from the power source, the converter for preventing the electrical heating energy from being conducted through the conductive structure of the airfoil.

In accordance with yet another aspect of the present invention, an electro-thermal ice protection system for an airfoil comprises: a plurality of metal foil heaters, each heater of the plurality for covering a segment of a leading edge of the airfoil; and a controller coupled electrically to the plurality of metal foil heaters for multiplexing electrical energy from a power source among the plurality of heaters in accordance with a pulse duty-cycle.

In accordance with yet another aspect of the present invention, an electro-thermal ice protection system for an airfoil comprises: a metal foil heater including a plurality of integral parting strip segments, the metal foil heater configurable to cover at least a portion of a leading edge of the airfoil with each integral parting strip segment of the plurality disposed along a corresponding segment of an air-stagnation zone of the leading edge; and a controller coupled electrically to the metal foil heater for controlling electrical energy from a power source to the metal foil of the heater and for controlling power to the plurality of parting strip segments of the heater to maintain at least a segment of the air-stagnation zone virtually free of ice formation.

In accordance with yet another aspect of the present invention, an electro-thermal ice protection apparatus for an airfoil comprises: a metal foil heater configurable to cover at least a portion of a leading edge of the airfoil, a metal foil surface of the heater including a parting strip area disposed along an air stagnation zone of the leading edge, and top and bottom shed areas on either side thereof; and a parting strip comprising a multiplicity of differently shaped island areas disposed on the metal foil surface within the parting strip area, each island area being separated from the other island areas by the metal foil surface.

In accordance with yet another aspect of the present invention, an electro-thermal ice protection system for an airfoil comprises: a metal foil heater configurable to cover at least a portion of a leading edge of the airfoil, a metal foil surface of the heater including a parting strip area disposed along an air stagnation zone of the leading edge, and top and bottom shed areas on either side thereof; a parting strip comprising a multiplicity of differently shaped island areas disposed on the metal foil surface within the parting strip area, each island area being separated from the other island areas by the metal foil surface; first and second conductors connected to the top shed area of the metal foil; third and fourth conductors connected to the bottom shed area of the metal foil; and a controller for controlling heating energy from a power source to the metal foil heater through the first, second, third and fourth conductors.

In accordance with yet another aspect of the present invention, a method of protecting an airfoil against undesired ice formation, said method comprises the steps of: configuring a metal foil heater to cover at least a portion of a leading edge of the airfoil; defining a parting strip area on a metal foil surface of the heater along an air stagnation zone of the leading edge; defining top and bottom shed areas on the metal foil surface on either side of the parting strip area; disposing a multiplicity of differently shaped island areas on the metal foil surface within the parting strip area, and separating each island area from the other island areas by the metal foil surface; and controlling heating energy through the parting strip area, the top shed area and the bottom shed area of the metal foil heater in a controlled sequence at different energy levels.

BRIEF DESCRIPTION OF THE DRAWINGS

FIG. 7 is a sketch of exemplary control circuitry suitable for use in controlling the heating of the plurality of heating elements disposed on the airfoil as depicted in FIG. 6.

FIG. 8 is a sketch of an alternate embodiment of control circuitry suitable for use in controlling the heating of the plurality of heating elements disposed on the airfoil as depicted in FIG. 6.

DETAILED DESCRIPTION OF THE INVENTION

Figure 1:
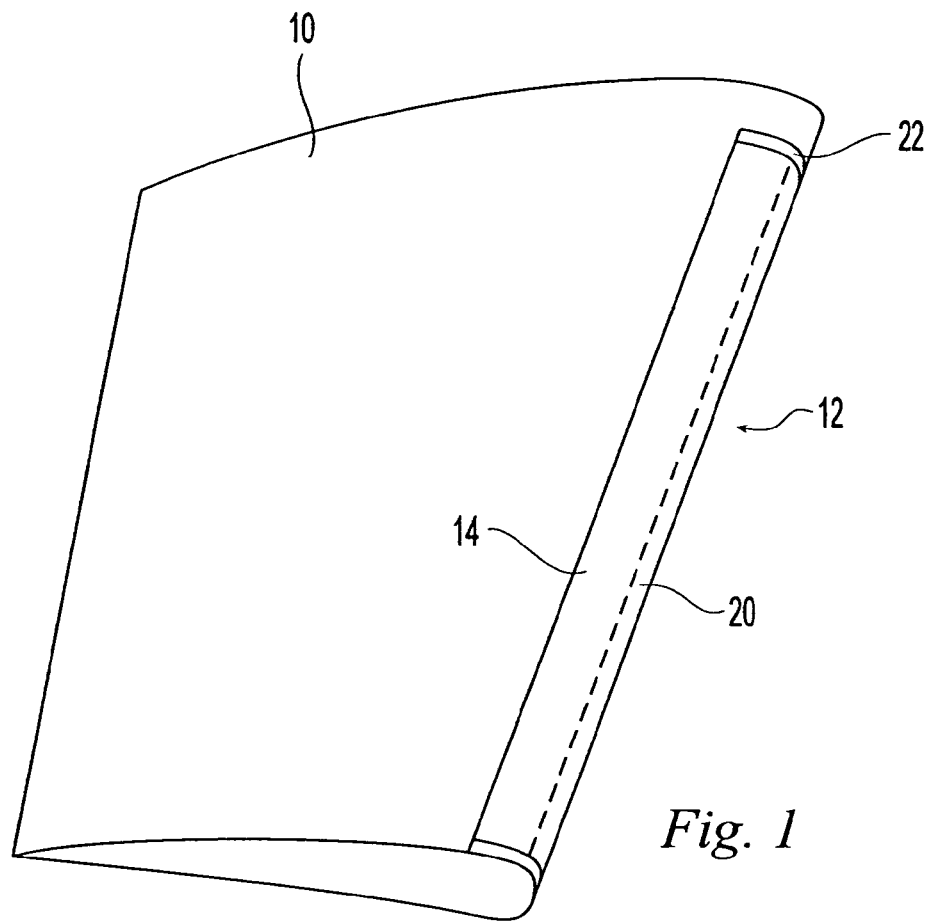
FIG. 1 is an isometric illustration of an airfoil section of an aero structure suitable for embodying one aspect of the present invention.

FIG. 1 is an isometric illustration of an airfoil section 10 of an aero structure suitable for embodying one aspect of the present invention. Referring to FIG. 1, wrapped around a leading edge 12 of the airfoil 10 in a C-shaped configuration is a metal foil heater 14. The metal material of foil heater 14 should be durable under and resistant to flight conditions of the airfoil 10, such as raindrop erosion and particulate abrasion, for example. In the present embodiment, the foil heater 14 comprises a rectangular sheet of Titanium having a thickness of approximately 0.004 inches or 4 mils with dimensions of approximately 66 inches in length and approximately 11 to 13 inches in width, for example.

Figure 2B:
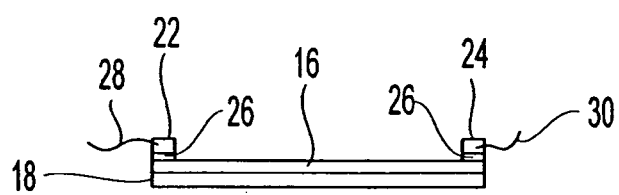
FIGS. 2A, 2B and 2C are plan, side and profile views of an exemplary metal foil heater suitable for use in the embodiment of FIG. 1.
Figure 2A:
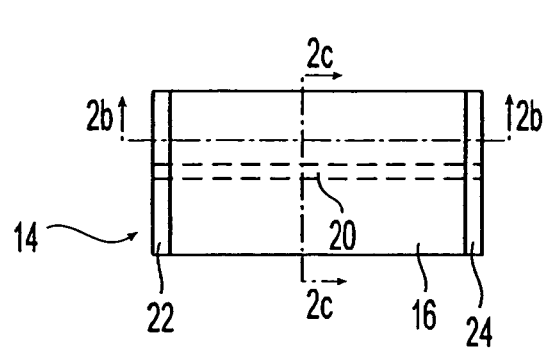
Figure 2C:
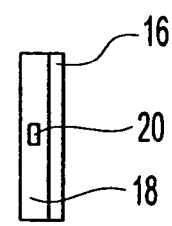

An exemplary Titanium foil heater 14 suitable for embodying the principles of the present invention is shown in plan, side and profile views in FIGS. 2A, 2B and 2C, respectively. Referring to FIGS. 2A, 2B and 2C, a Titanium metal sheet or layer 16 is disposed over an insulating layer 18 which may have a thickness of approximately 0.0005 to 0.050 inches, for example. The Titanium foil sheet 16 is attached to the insulating layer 18 using aircraft-approved adhesives. The side of the Titanium layer 16 in juxtaposition with the insulating layer 18 may be chemically treated to improve surface adhesion therebetween. The insulating layer 18, which may be comprised of Kapton, Fiberglass, a polyamide material or the like, for example, provides both electrical and thermal isolation between the Titanium foil 16 and the airfoil 10. A parting strip 20 which may be approximately 0.625 inches wide and 0.020 inches thick, for example, may be embedded within the insulation layer 20 down the length of the foil heater at approximately the center thereof. The parting strip 20 may be of the same material as the foil sheet 16 and electrically insulated therefrom.

To conduct electrical energy to the foil heater element 16, Copper bus bars 22 and 24 are disposed on the foil sheet 16 respectively across the widthwise edges thereof. Since Copper may not be conveniently soldered or brazed directly to the Titanium sheet, the Titanium foil 16 will need treatment in the edge areas where the bus bars 22 and 24 are to be attached. In the present embodiment, layers of Nickel 26 are plated to the Titanium foil 16 at the widthwise edge areas to a thickness of approximately 0.001 to 0.003 inches, for example. Then, the Titanium foil 16 is heat treated preferably at temperatures close to the melting point of the Nickel material for approximately one to four hours to form a better bond of Nickel to Titanium. Alternately, a layer of Nickel may be electro less plated to the Titanium sheet 16 along the widthwise edge areas followed by a final or top layer of Nickel electro plated to the electro less plated Nickel layer to improve the adhesion of the nickel to the Titanium. Then, the Copper bus bars 22 and 24 are soldered to the Nickel layers 26 at the widthwise edges of the Titanium foil 16. Conductor wires 28 and 30 are soldered to the bus bars 22 and 24, respectively, to conduct electrical energy from an electrical source to heat the Titanium foil 16 as will become more evident from the following description. Since the parting strip 20 also comprises Titanium in the present embodiment, electrical wiring connections may be made at the ends thereof in the same or similar manner as that just described for the metal foil 16, for example.

Figure 3:
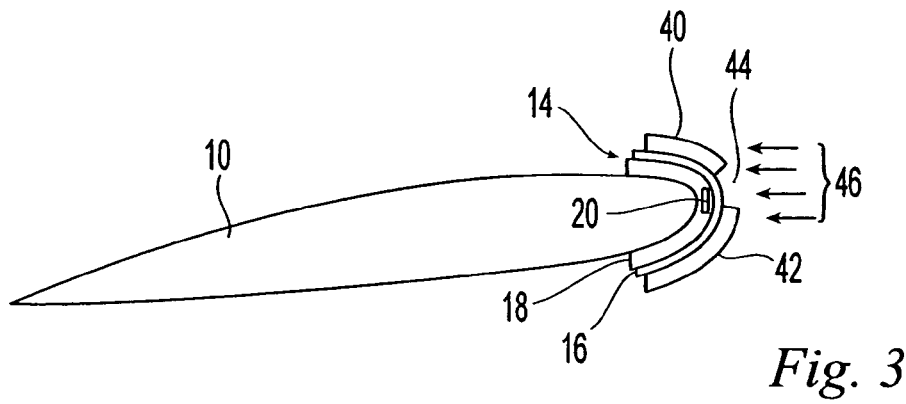
FIG. 3 is a cross-sectional view of the metal foil heater disposed over a leading edge of the airfoil in accordance with one embodiment of the present invention.

A cross-sectional depiction of the airfoil 10 and foil heater 14 is shown in FIG. 3 to better illustrate the configuration of the present embodiment. Referring to FIGS. 1 and 3, the width of the foil heater 14 is wrapped chord wise around the leading edge of the airfoil 10 in a C-shaped configuration along at least a portion of the span wise length thereof. The leading edge facing surface of the insulating layer is attached to the leading edge surface of the airfoil 10 by the use of aero approved adhesives, for example. In the case in which the airfoil leading edge is constructed using composite materials, the Titanium foil sheet 16, parting strip 20 and/or insulating layer 18 may be disposed into the composite forming mould and cured into the aero structure leading edge, for example. The foil heater 14 is positioned chord wise so that the parting strip 20 is approximately at the air-stagnation line which runs span-wise along the leading edge of the airfoil 10. When energized, the parting strip heater 20 is operative to keep a span-wise area or zone 44 along the air-stagnation line substantially free and clear of ice during flight so that ice will accrete only in the aft shed zones typically located on the top 40 and bottom 42 of the air-stagnation zone 44.

If ice is permitted to accrete chord wise completely around the leading edge, it will become mechanically linked in a C-shaped ice bridge and aero wind drag forces shown by the arrows 46 will not be able to overcome the tensile strength of the connecting ice bridge from top to bottom of the airfoil 10. Thus, the parting strip heater 20 is operative to render the accreted ice on the leading edge of the airfoil 10 in a clam shell formation in order to be vulnerable to aero wind drag forces 46 as will become better understood from the following description.

Figure 4:
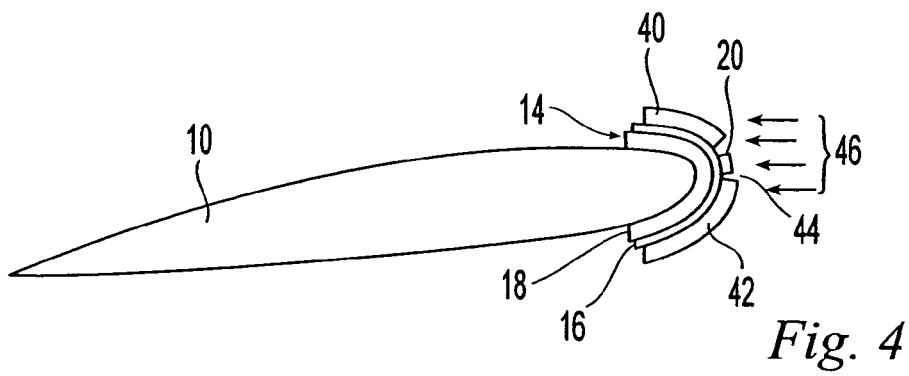
FIG. 4 is a cross-sectional view of the metal foil heater disposed over a leading edge of the airfoil in accordance with another embodiment of the present invention.

In an alternate embodiment, as shown by the cross-sectional airfoil illustration of FIG. 4, the parting strip heater 20 may be affixed to the outer surface of the metal foil 16 span wise along the air-stagnation zone 44 of the leading edge. In this arrangement, the parting strip 20 is insulated both electrically and thermally from the metal foil 16 and will perform the same function as described in connection with the embodiment of FIG. 3, except with less heating power since it does not have to heat ice through the insulating layer 18 and metal foil 16 which will absorb heat energy and thus, lower efficiency. However, the externally mounted parting strip heater 20 of this alternate embodiment is more vulnerable to the effects of the environmental conditions of flight.

Referring back to FIGS. 1 and 3, as noted above, the heating surface of heater 14 is bare metal Titanium foil 16 with no outer protective layer. Thus, ice will form directly on the bare metal surface of the Titanium foil 16 and be heated directly from the metal surface. In the present embodiment, there are no heat losses through insulating and adhesive layers of outer protection to contend with, rendering the heater 14 most efficient. The outer surface of the Titanium foil may be polished to improve upon the heat transfer to the ice formation. Even if the Titanium foil endured damage, like in the form of a tear or a hole, for example, it could remain effective in ice protection. It has been found through wind tunnel testing, that a tear or hole in the Titanium foil just creates a cold spot and that heat energy will be conducted around the hole or tear. While ice formation at the damaged area of the foil surface may take upon a different shape than the rest of the foil, it will nonetheless be shed with the other ice formations.

Notwithstanding, the direct bare metal heater contact with the ice, it will nonetheless take a watt density of at least 30 watts/square inch to be effective in shedding the ice from the metal foil surface. Consequently, to cover the entire span of an airfoil using conventional methods, it may take more electrical energy than the power source of the aero structure can withstand without affecting power to other electrical systems. The present invention provides a method and system for shedding ice from the airfoil surface of the aero structure utilizing the metal foil heater 14 at lower power than conventional proposed electro-thermal ice protection systems.

The present embodiment utilizes the parting strip 20 of the heater 14 to maintain a parting strip zone 44 substantially free and clear of ice which renders ice formation only in upper and lower airfoil regions 40 and 42, respectively, i.e. in a clam shell formation along the leading edge of the airfoil 10. In the present embodiment, the parting strip 20 is energized independently of the metal foil 16. However, to keep the parting strip zone 44 free and clear of ice formation, the parting strip 20 may consume with continuous application of electrical energy at least fifty percent of the total electrical energy budget of the aero power source afforded for ice protection. Applicants have found that by pulsing the parting strip with electrical energy over short interpulse periods, virtually the same effect could be achieved, but with substantially reduced power.

For example, if heating power pulses of 100 milliseconds were applied to the parting strip 20 approximately every second, then only a very thin frost of ice is formed in the interpulse period. Thus, so long as the power pulse was sufficient to melt the frost layer each time it was applied to the parting strip 20, then the parting strip zone 44 will remain effectively clear of ice, i.e. other than the frost layer. Under these conditions, it was found that sufficient power for each pulse to remove the frost layer was approximately five times the power for continuous application, but the duty cycle was 1:10. Accordingly a power saving of 50% is realized by pulsing power. It is understood that pulsed power may be applied to the parting strip 20 at other power levels and with other duty cycles depending on the aero structure application without deviating from the broad principles of the present invention.

Once the parting strip zone 44 is kept virtually free of ice, then the ice forms in a clam shell configuration directly on the metal foil 16 at the upper and lower zones 40 and 42, respectively. This clam shell ice formation must also be shed to protect the aero structure. Applicants realized that if the ice bond at the interface between the ice layers at zones 40 and 42 and the surface of the metal foil 16 could be weaken, the wind shear forces 46 could then peal off the clam shell ice formations in the aft shed zones 40 and 42 in sheets or chunks from the metal foil 16. Accordingly, instead of having to commit continuous electrical energy to the heater metal foil 16 to melt the ice formations at zones 40 and 42, the ice protection system of the present invention may merely apply just enough electrical energy to weaken the interfacial ice bond and let the wind shear forces 46 complete the ice removal process.

Applicants further realized that average electrical heating power may be effectively reduced by pulsing the electrical energy to the metal foil 16 instead of continuous application. That is, high watt density may be applied to the foil heating element 16 with relatively short, high power pulses without a severe demand on the aero power source. The short duration, high power pulses may be provided by an energy storage device (ESD), which serves to buffer the electrical impact to the aircraft or vehicle on which the ice protection system is installed. In an alternate embodiment, the high power pulse may be sourced by an additional power generation device which serves to separate the ice protection power system from other aircraft or vehicle power systems.

Reduction in heating power is not the only benefit of pulsing the power to the heater 14. Continuous application of power to the bare metal foil 16 will maintain a warm surface on which ice may not form, but rather be swept across in a melted form to a colder region on the airfoil in back of the heater 14 where the ice may refreeze. Thus, ice may build up to form a ridge along the span of the outer edge of heater 14 which could have an undesirable affect on airfoil flight dynamics. With pulse application of heating power, the ice formation is only heated during the pulse period and only with sufficient power to weaken the interfacial ice bond. Ice formation is then removed by the wind shear forces. During the interpulse periods, the surface of the metal foil 16 remains at a temperature to permit ice to reform. Under, these conditions, runback and refreezing of ice can not appreciably take place.

However, it is understood that not only does the power pulse require sufficient energy to weaken the interfacial ice bond, but the power pulse must be applied to the metal foil 16 long enough so that the wind shear forces 46 can peal off and remove the ice formations. Petrenko, in the co-pending U.S. patent application Ser. No. 10/364,438 referenced above, recommends that the power pulse to a heater be made as short as possible by raising the amount of energy in the pulse. Petrenko teaches that the pulse width is proportional to the inverse square of the watt density W. Thus, by increasing W, the pulse width may be decreased proportionally by the factor $1/W^2$. While creating a narrower heating pulse may tend to decrease the power requirements to weaken the interfacial ice bond, it does not take into account the amount of time needed for the wind shear forces to peal away the ice formation.

It has been found that narrowing the heating pulse applied to the metal foil heating element 16 may sufficiently weaken the interfacial ice bond for ice formation movement, but if too narrow, the ice formation may merely slide along the heated surface under the forces of the wind shear and refreeze upon pulse termination without being pealed away. This will of course allow more ice to be formed over top of the old ice during the interpulse period which is an undesirable result. Applicants have recognized that a proper balance among the factors of heating power reduction, width of the heating pulse and interpulse period is of paramount importance in designing a viable low power, pulsed electrothermal ice shedding system for aero structures.

That is, the pulse should contain enough heating energy to weaken the interfacial ice bond and be maintained just long enough for the wind shear forces to peal or shed the ice from the heating surface. In addition, the interpulse period should be made just long enough to allow ice to reform on the metal foil surface to a thickness that may be pealed off by the shear forces of the wind stream. Accordingly, a properly selected heating duty cycle for the metal foil heating element 16 will provide for the shedding of ice from the airfoil in sheets not large enough to be a hazard to the flight of the aero structure. It is further understood that the heating duty cycle may be changed according to those parameters which tend to affect ice removal, like air temperature, air speed of the aero structure, and liquid water content of the ice formations, for example.

Figure 5:
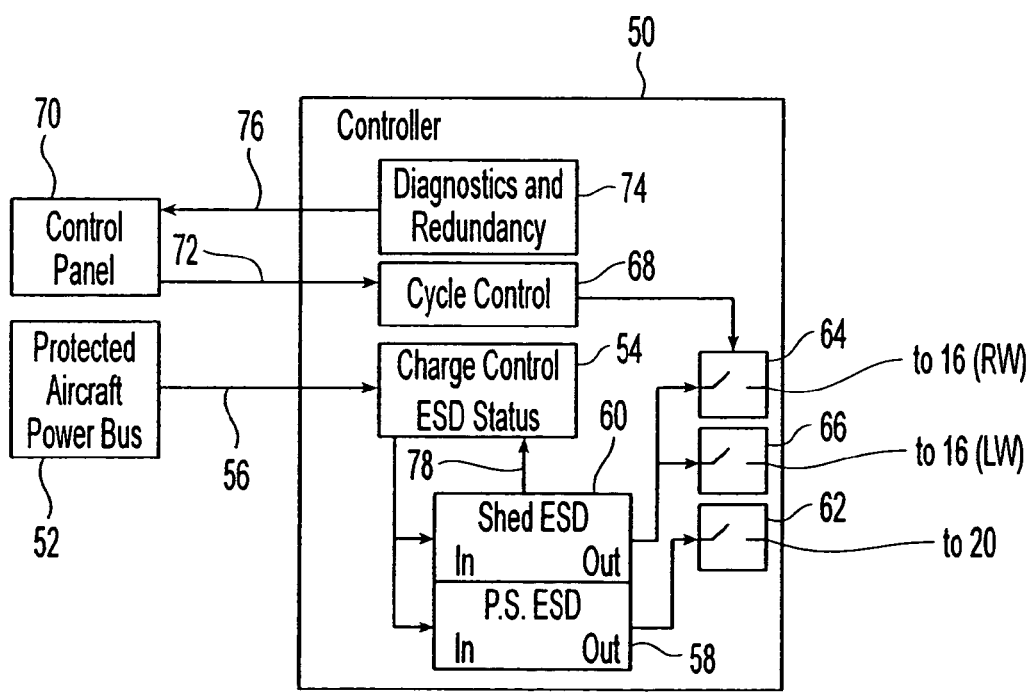
FIG. 5 is a block diagram schematic of an exemplary controller for the metal foil heater suitable for embodying another aspect of the present invention.

FIG. 5 is a block diagram schematic of a controller 50 for the airfoil heater 14 suitable for embodying another aspect of the present invention. Referring to FIG. 5, a charge control unit 54 of the controller 50 may be powered through power lines 56 from the aero structure's power bus 52 which may be at a voltage of 28 VDC, for example. The charge control unit 54 may include a voltage multiplier circuit to increase the aircraft power source's voltage level if deemed desirable for improved operation. The controller 50 further includes a parting strip (P.S.) energy storage device (ESD) 58 and a shed ESD 60. In the present embodiment, each of the ESDs 58 and 60 include a bank of ultracapacitors (not shown) for the storage of electrical energy at the voltage level supplied by the charge control unit 54. The P.S. ESD 58 is coupled to the parting strip 20 through a switching element 62 which may be an electronic switch comprised of one or more power metal oxide semiconductor field effect transistors (MOSFETs), for example. In addition, the shed ESD 60 is coupled to the metal airfoil heating element 16 through another switching element 64 which may also comprise one or more power MOSFETs, for example.

If the aero structure of the present embodiment is an aircraft with right and left wing airfoils, then the switch 64 may be coupled between the shed ESD 60 and the heating element 16 of the right wing (RW) airfoil. In this case, another switching element 66 couples the shed ESD 60 to the heating element 16 of the left wing (LW) airfoil. A switch cycle control unit 68 is included in controller 50 to control the switching operation of switches 62, 64 and 66 as will become more evident from the following description. Switching parameters of the cycle control unit 68 may be adjusted through a control panel 70 utilizing signal lines 72. Still further, the controller 50 may include a diagnostics and redundancy unit 74 which may be also coupled to and operative in conjunction with the control panel 70 via signal lines 76.

In the present embodiment, the controller 50 is operative to control the duty cycle power pulse application of electrical energy to the metal foil heating elements 16 (RW) and 16 (LW) and the parting strip 20 of the heaters. In the present example, each wing airfoil Titanium metal foil heater may be approximately 66 inches in length, 11 to 13 inches in width and 0.004 inches thick with a resistance on the order of 20 milliohms, and each parting strip 20 may be approximately 66 inches in length, 0.625 inches in width and 0.020 inches thick with a resistance of 0.20 to 0.060 milliohms.

In the present embodiment, the charge control unit 54 controls charging the shed ESD 60 from the power source 52 with 10 amps at a nominal voltage of 56 VDC, for example. Note that the present system is not limited to a single operating voltage; in fact, operating voltages in the range of 28V to 230V (AC or DC) were found to provide good results. ESD 60 may include a separate storage unit for each wing heater. Unit 54 may monitor the status of the ESDs in unit 60 over signal lines 78. The cycle control 68 controls the duty cycle of the switches 64 and 66 which may be closed for a pulse width of approximately one second every three minutes, for example. Upon closure, the switches 64 and 66 discharge the electrical energy stored in their respective storage unit into the respective wing airfoil heater. During switch closure, current is discharged from the storage devices of unit 60 at approximately 1200 amps into the heater metal foil elements 16 (RW) and 16 (LW). This amount of heating energy applied to each metal foil element renders sufficient heat to weaken the interfacial ice bond and the pulse width of approximately one second is sufficient time to permit the wind shear to peal away the ice layer formed during each 3 minute interpulse period. This pulsed heating duty cycle may be adjusted via control panel 70 according to certain measurable parameters as noted above. If the heater power budget is restricted, pulsed power may be multiplexed to the heater element of each airfoil wing.

Also in the present embodiment, the charge control unit 54 controls charging the P.S. ESD 58 from the power source 52 with ten amps at a voltage of 56 VDC, for example. ESD 58 may include a separate storage unit for the parting strip 20 of each wing heater. Unit 54 may monitor the status of the ESDs in unit 58 over signal lines 78. The cycle control unit 68 controls the duty cycle of switch 62 which may be closed for a pulse width of approximately 100 to 400 milliseconds every second, for example, depending on icing conditions which may be sensed by the controller. Upon closure, the switch 62 discharges the electrical energy stored in the storage unit 58 into the parting strips 20 of the wing airfoil heaters. During switch closure, current is discharged from the storage devices of unit 58 at approximately seventy to ninety amps into the parting strips 20. This amount of heating energy applied to each parting strip element renders sufficient heat to maintain each parting strip zone virtually free from ice. This pulsed heating duty cycle of the parting strips may be adjusted via control panel 70 according to certain measurable parameters as noted above.

Figure 6:
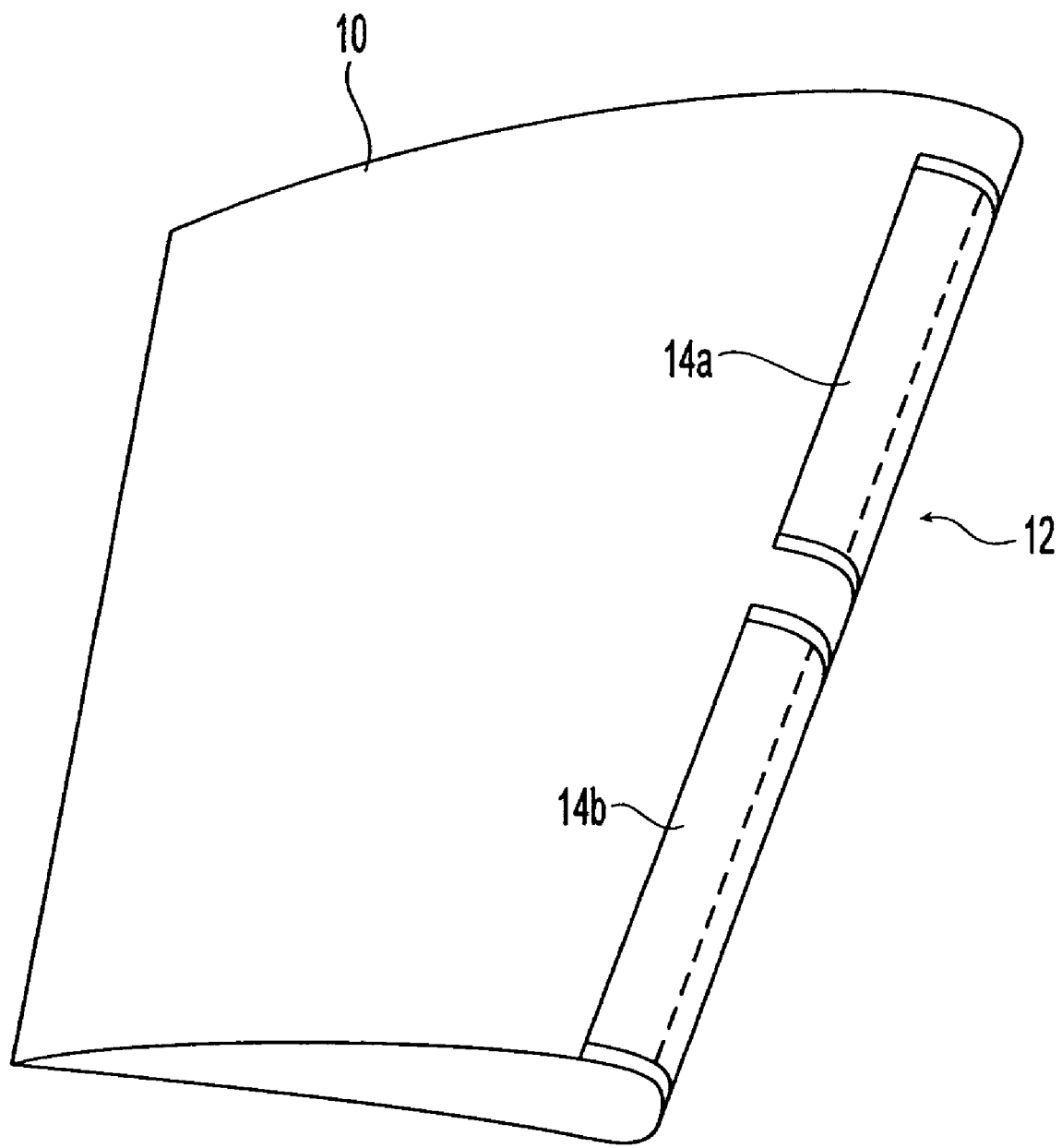
FIG. 6 is an illustration of an alternate embodiment of the present invention including a plurality of heating elements disposed along the span of the leading edge of the airfoil.

If one metal foil heating unit 14 is not long enough to cover the leading edge span of the airfoil wing 10, then more than one metal foil heating elements 14 may be disposed along the span of the leading edge 12 length wise adjacent to each other. An illustration of an alternate embodiment including two heating elements 14a and 14b is shown in FIG. 6. Exemplary circuitry for controlling the heating the multiple heating elements 14a and 14b of a wing airfoil is shown in the sketch of FIG. 7. Note that in this embodiment, the inner bus bars of the elements 14a and 14b are connected together to form a circuit node A and a circuit node C, the outer bus bar of heater element 14a forms a circuit node B, and the outer bus bar of heater element 14b forms a circuit node D. Referring to the sketch of FIG. 7, heating energy is drawn over a power bus from the aircraft source 100 at approximately 28 VDC. The power bus comprises a supply line 102 and a return line 104. In series with the supply line 102 may be a breaker 106 and coupled across the power bus is a high power metal oxide varistor (MOV) 108 for lightning strike protection.

The aero power supply and return lines 102 and 104, respectively, may be coupled to an input 112 of a DC—DC converter 110 which is operative to convert the voltage of the aero power source to a higher voltage. In the present embodiment, the converter 110 is a voltage doubler raising the voltage level to 56 VDC, for example, across an output 114 thereof. The output 114 includes a supply line 116 and a return line 118. Coupled across the supply and return lines 116 and 118, respectively, is an energy storage unit 120 comprising a plurality of series connected ultracapacitors which may total approximately 100–300 Farads, for example. The supply side 116 of the energy source 120 is commonly coupled to the poles of two single-pole-single throw switches 122 and 124 which may be comprised of one or more power MOSFETs, for example. The throw sides of switches 122 and 124 are coupled to nodes A and B, respectively. A third single-pole-single-throw switch 126 which may be also comprised of a configuration of power switching devices, such as MOSFETs, relays, or other solid-state devices, for example, is coupled between node C and return line 118. And, node D is coupled to return line 118.

The circuitry may include a time sequence controller 130 powered by the supply 116 and return 118 lines for controlling the sequential operation of the switches 122, 124 and 126 to multiplex power pulses into the metal foil heaters 14a and 14b. For example, switches 122, 124 and 126 may be controlled open for an interpulse period of approximately one to ten minutes (depending on the capacity of the ESD) to allow the energy storage unit 120 to be fully charged from converter 110, then switch 122 may be closed for approximately one to three second to discharge the energy stored in the storage unit 120 through the metal foil element of heater 14b between nodes A and D at a current of approximately 1200 amps, for example. The discharge loop is closed from node D over return line 118. Thereafter, switches 122, 124 and 126 are controlled open for another interpulse period during which storage unit 120 is recharged from the converter 110. Then, switches 124 and 126 are closed simultaneously for approximately one to three seconds to discharge the energy stored in the storage unit 120 through the metal foil element of heater 14a between nodes B and C at a current of approximately 1200 amps, for example. The discharge loop is closed from node C over return line 118. This time sequence may be repeated periodically.

An alternate embodiment of the multiple heater control circuitry is illustrated in the exemplary circuit schematic of FIG. 8. Referring to FIG. 8, the two heater sections 14a and 14b are shown disposed at the leading edge of the airfoil 10. The heater sections 14a and 14b are connected together at their inner bus bars to form node A, the outer bus bar of section 14a forms node B and the outer bus bar of section 14b forms node D as described in connection with the embodiment of FIG. 7. Node A is connected to a pole of a single-pole-double-throw switch 132 which may be comprised of a configuration of power MOSFETs, for example. One throw of switch 132 is connected to the supply line 116 from the storage unit 120 and the other throw is connected to the return line 118. Node D is also connected to the return line 118. A single-pole-single-throw switch 134 which may be also comprised of a configuration of power MOSFETs, for example, has its pole connected to node B and its throw position to the supply line 116. The time sequence controller 130 may also control the operation of switches 132 and 134 for multiplexing power pulses to the heater sections 14a and 14b.

For example, switches 132 and 134 may be controlled open for an interpulse period of approximately one to ten minutes to allow the energy storage unit 120 to be fully charged from converter 110, then switch 132 may be switched to the supply line 116 for approximately one to three seconds to discharge the energy stored in the storage unit 120 through the metal foil element of heater 14b between nodes A and D at a current of approximately 1200 amps, for example. The discharge loop is closed from node D over return line 118. Thereafter, switches 132 and 134 are controlled open for another interpulse period during which storage unit 120 is recharged from the converter 110. Then, switch 132 is switched to the return line 118 and switch 134 is switched to the supply line 116 simultaneously for approximately one to three seconds to discharge the energy stored in the storage unit 120 through the metal foil element of heater 14a between nodes B and A at a current of approximately 1200 amps, for example. The discharge loop is closed from node A over return line 118. This time sequence may be repeated periodically.

In the present embodiment, the controller box and ESD may be disposed on the aircraft or vehicle at a location permitted for safe design practices. Preferably, the location on the aircraft or vehicle should be chosen to minimize power loss due to $I^2R$ heating of the wires that deliver the power to the metal foil sheets that cover the leading edges.

In connection with the foregoing described embodiments, there is concern with the airfoil heater section(s) taking a lightning strike in which case the lightning current could pass back through to the aero power source via the return line 118 and damage or affect the aircraft's power supply and/or avionics. Conventionally, a lightning strike conducted to the airfoil of the aero structure will pass to the airframe ground which is configured to protect the power supply and avionic systems. To eliminate the lightning hazard with the metal foil heater section, it is proposed to connect the bus bar of an outer end of the metal foil heater section to the airframe ground 140 as shown in the embodiments of FIGS. 7 and 8. Thus, the current from any lightning striking the metal foil heater section will enter the airframe and be diffused thereby. But, this configuration alone will merely permit the large shed currents which may be on the order of 1200 amps, for example, to return through the rivets and connections of the airframe back to the source which is not considered desirable.

So, to avoid the airframe serving as a current return path for the heater shed current, it is further proposed to include an isolated circuit stage at the output 114 of the DC—DC converter 110. For example, the input stage 112 may be coupled to the output stage 114 through an isolation barrier, like a transformer, with an isolation voltage of approximately 1500 volts, for example. The source voltage from the input stage 112 may be chopped at a frequency of 50–500 kHz at the primary of a step-up transformer and coupled electromagnetically through the transformer to the secondary at a higher voltage level. Accordingly, the circuitry on the secondary side of the transformer as described in connection with the embodiments of FIGS. 7 and 8 will be isolated from the circuitry on the primary side thereof. Thus, connecting node D of the heater section 14b which is at or near the tip of the airfoil 10 to airframe ground will not permit the heater section current to pass through the airframe, but rather be returned to the isolated stage of the converter 110 over the return wiring 118. Any lightning voltage which may be coupled across the isolation barrier of converter 110 will be diminished by the MOV 108 to protect the power source 100 and avionics supplied therefrom.

In this embodiment, the parting strip which may be buried in the insulating layers of the heating sections 14a and 14b may be powered separately from the isolated stage of converter 110 because it requires a large amount of energy to maintain the parting strip zone along the leading edge of the entire wing span virtually free and clear of ice. Since the parting strip is buried in the insulating layer of the heater section, it is protected from any lightning strikes of the metal foil heater. The lightning strike may cause a hole to be burned in the metal foil of the heater but will not penetrate through the insulating layer to the parting strip. So, it is considered relatively safe to power the parting strip in this embodiment directly from the power source 100, for example, without converter isolation. Of course, if a further reduction in heating power requirements is desired, the isolated output stage may be configured to accommodate a pulsing of the parting strip through a separate energy storage unit and switching arrangement as described herein above.

Figure 9:
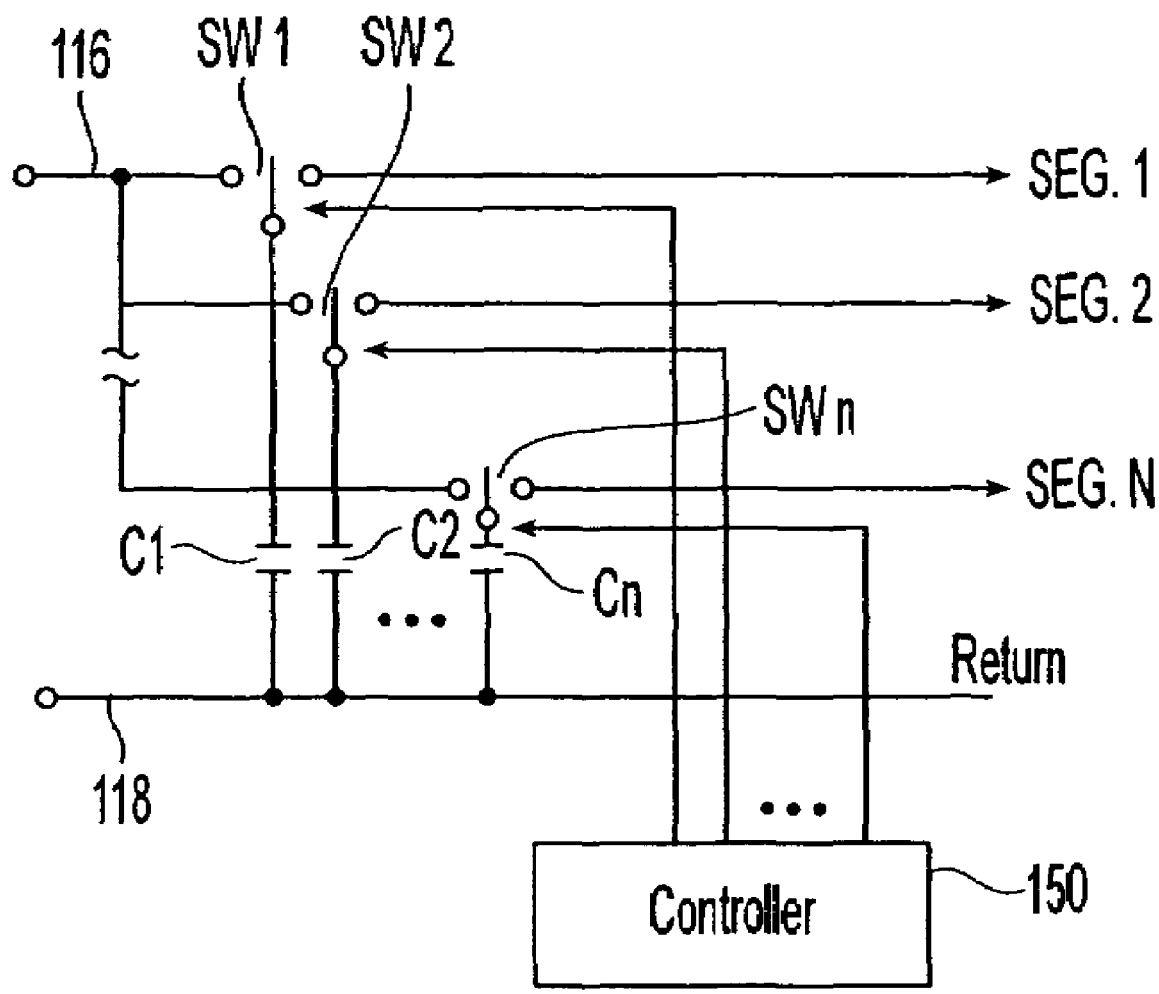
FIG. 9 is a sketch of another alternate embodiment of control circuitry suitable for use in controlling the heating of the plurality of heating elements utilizing a corresponding plurality of energy storage units.

To reduce heating power requirements for ice shedding even further, it is possible to divide up a wing airfoil heater into multiple heater sections or segments 1 through N, for example, and distributing the N segments along the leading edge of the airfoil as described herein above. In so doing, the energy storage unit for each segment may be made substantially smaller than for an entire wing span heater and the power pulses may be sequentially applied to each heater segment. Exemplary control circuitry for controlling the multiple heater segments is shown in the circuit schematic of FIG. 9. Referring to FIG. 9, the supply line 116 from the output 114 of the converter 110 is coupled to a throw position of a multiplicity of single-pole-double-throw switches SW1, SW2, . . . , SWn. The other throw position of each switch SW1, SW2, . . . , SWn is coupled to the metal foil element of heater segments SEG. 1, SEG. 2, . . . , SEG.N, respectively. The pole of each switch SW1, SW2, . . . , SWn is connected respectively to a relatively small energy storage unit. The respective energy storage units C1, C2, . . . , Cn of the present embodiment each comprise one or more ultracapacitors, for example. The switches may be time sequenced by a controller unit 150.

For example, switch SW1 may be switched by controller 150 to connect supply line 116 to the storage unit C1 for charging C1 during an interpulse period. The other switches SW2, . . . , SWn remain in an open or unconnected state. After the unit C1 is fully charged, switch SW1 is switched to discharge C1 into the heater segment SEG. 1 for a predetermined pulse width and then, returned to an open state. Thereafter, switch SW2 may be switched by controller 150 to connect supply line 116 to the storage unit C2 for charging C2 during an interpulse period. The other switches SW1, . . . , SWn remain in an open or unconnected state. After the unit C2 is fully charged, switch SW2 is switched to discharge C2 into the heater segment SEG. 2 for a predetermined pulse width and then, returned to an open state. This process continues sequentially through to switch SWn and storage unit Cn. The control is then returned to switch SW1 and the procedure is repeated. In this manner, power pulses may be applied to the heater segments SEG. 1–SEG. N sequentially from the respectively corresponding energy storage units C1–Cn. While the present embodiment uses individual storage units for each of the heater segments, it is understood that a common storage unit sequentially charged and discharged will function just as well without deviating from the broad principles of this aspect of the present invention.

Figure 10:
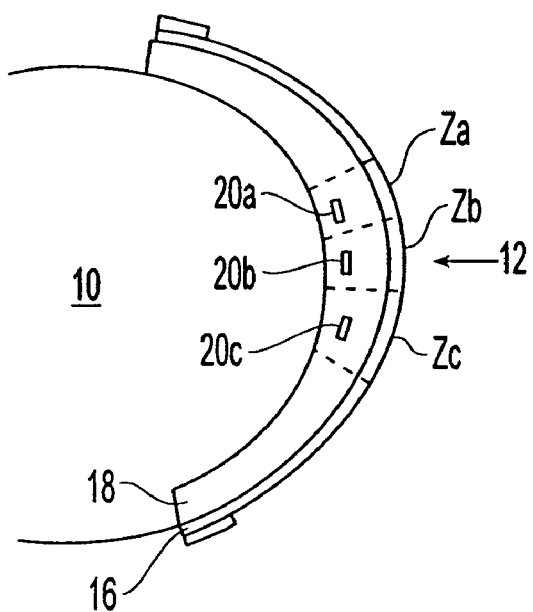
FIG. 10 is an embodiment of another aspect of the present invention utilizing a plurality of narrow parting strips integral to the metal foil heater for maintaining the air-stagnation zone of the airfoil virtually free of ice.

To further reduce heating power requirements for maintaining the parting strip zone of the leading edge 12 of the airfoil 10 virtually free and clear of ice, a plurality of narrow parting strips 20a, 20b, and 20c may be embedded in the insulating layer 18 adjacent to one another chord wise along the parting strip zone as shown in the cross-sectional illustration of FIG. 10. Each narrow parting strip 20a, 20b, and 20c consumes less heating power than wider parting strip 20 of the embodiments described herein above. The plurality of narrow parting strips may be pulsed with power sequentially using the control circuitry similar to that shown in FIG. 9 and in much the same manner as described therefor. That is, instead of pulsing the individual energy storage units to discharge energy into airfoil heater segments, they may be controlled to discharge energy sequentially into the plurality of parting strip segments 20a, 20b, 20c, and so on. Accordingly, each parting strip segment 20a, 20b, 20c will maintain its respective zone Za, Zb, Zc virtually free and clear of ice with substantially less average power.

Typically, the angle of attack (AOA) of an airfoil changes as the aircraft climbs and descends which causes the stagnation line of the airfoil to migrate around the chord wise dimension of the airfoil. It is further understood that wide parting strips are currently contemplated for use to cover the migration zone of the stagnation line of the airfoil as the AOA migrates. This method consumes more heating power for the wide parting strip than would be needed to maintain ice removal just along the migrating stagnation line. If a plurality of narrower parting strips 20a, 20b, 20c were embodied in the heater unit to maintain ice removal from respective zones Za, Zb, Zc as shown in the cross-sectional illustration of FIG. 9, then only the parting strip along the current stagnation line need be selectively and individually energized to heat the respective zone.

Figure 11:
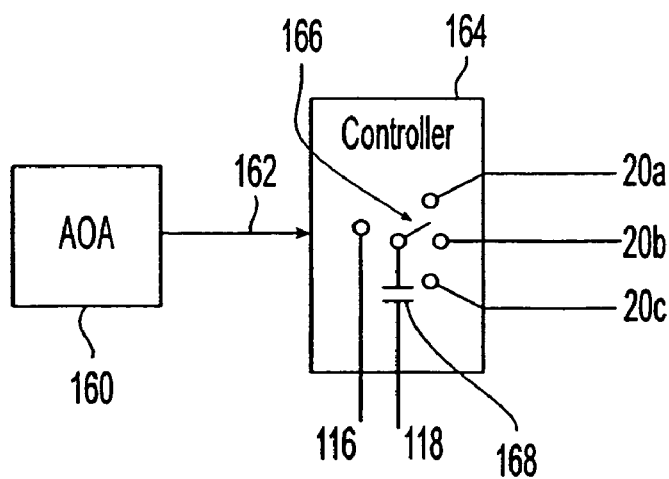
FIG. 11 is a block diagram schematic of an exemplary controller suitable for use in the embodiment of FIG. 10.

A block diagram of an exemplary control unit for controlling the selective energization of the appropriate narrow parting strip is shown in FIG. 11. Referring to FIG. 11, an existing aircraft mounted AOA sensor 160 may be used to track the current zone of the stagnation line along the chord of the leading edge 12 (see FIG. 10). Tracking information in the form of an analog voltage or current may be supplied over lines 162 to a selection controller 164 which comprises a single-pole-multi-throw selection switch 166 having one throw position connected to the supply line 116 and other throw positions coupled respectively to the parting strip segments 20a, 20b, 20c, for example. The pole of switch 166 is connected to a common energy storage unit 168 which is coupled to the return line 118.

As the controller 164 determines the zone of the current stagnation line from the AOA information provided over lines 162, it controls switch 166 to charge the storage unit 168 for an interpulse period and then, controls switch 162 to discharge the storage unit to the parting strip 20a, 20b or 20c corresponding to the current stagnation line zone Za, Zb or Zc (see FIG. 10). In this manner, power pulses are selectively pulsed with a duty cycle only to the parting strip of the current stagnation line zone at any given time. Since only one narrower parting strip of the plurality is energized, less average power is used for heating. The controller 164 may view the other parting strip zones as shed zones instead of parting strip zones and control them accordingly.

Figure 12:
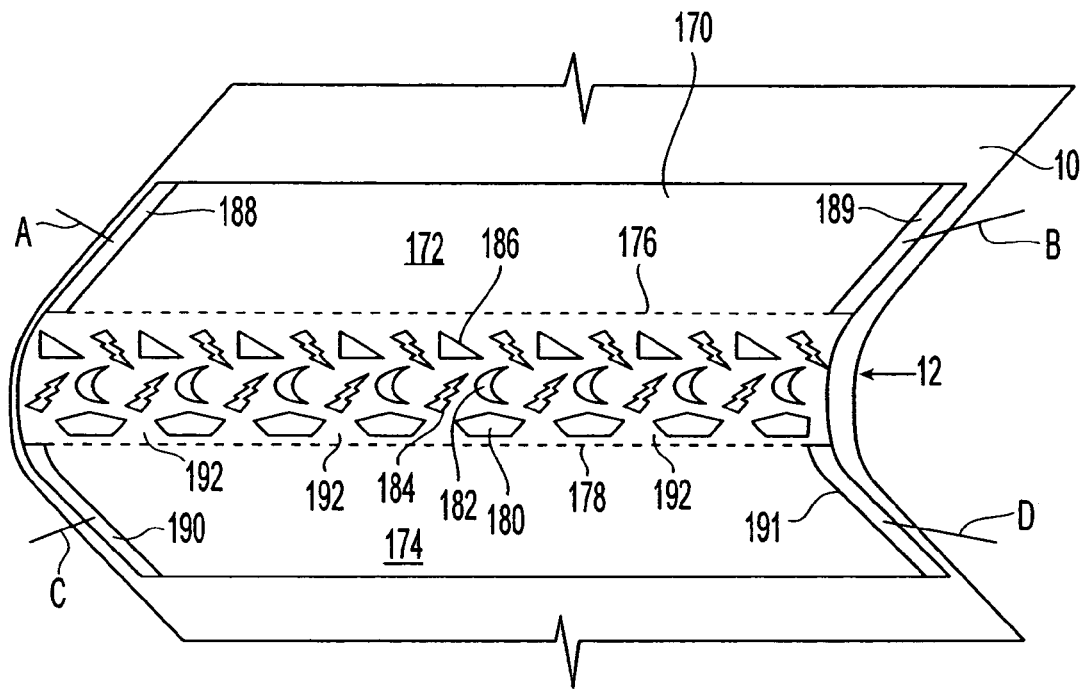
FIG. 12 is an embodiment of yet another aspect of the present invention utilizing an integral parting strip comprising a multiplicity of island areas in a parting strip area of a metal foil heater.

In another aspect of the present invention, the parting strip 20 as described in connection with the embodiments herein above may be altered in shape to further reduce the amount of heating energy needed to keep the parting strip zone virtually free from ice. In one embodiment of this aspect of the present invention, the parting strip 20 is replaced with a multiplicity of very small heating elements spatially scattered over the entire air-stagnation zone area of the metal foil heater. An exemplary embodiment of this aspect of the present invention is shown in the illustration of FIG. 12. Referring to FIG. 12, a metal foil heater 170 is disposed over the airfoil 10 covering the leading edge 12 and extending over top and bottom aft ice shedding zones 172 and 174, respectively. The parting strip area of the metal foil heater, which is delineated by the dashed lines 176 on the top and 178 on the bottom, is intended to cover the air-stagnation zone of the airfoil 10. This parting strip of area 176, 178 includes a multiplicity of small areas or islands of different shapes, like those shown by outlines 180, 182, 184, and 186, for example. These different shaped islands have areas generally sized from 0.25 to 1.5 square inches, for example, and may be formed on the surface of the metal foil 14 by Nickel plating to a predetermined thickness. The surface areas of the metal foil in between the parting strip islands in the zone 176, 178 are not plated.

Also, in the present embodiment, conductive bus bars 188 and 189 are disposed respectively along the edges of the metal foil surface of the top aft shedding area 172 and conductor wires A and B are respectively connected thereto. Likewise, conductive bus bars 190 and 191 are disposed respectively along the edges of the metal foil surface of the bottom aft shedding area 174 and conductor wires C and D are respectively connected thereto. If Titanium is used as the metal foil, then layers of Nickel and Copper form the bus bars as described herein above. Preferably, extra Nickel plating may be applied under the area of the bus bars where the conductor wires are soldered. Note that there are no bus bars disposed on the metal foil surface within the parting strip area 176, 178. The conductor wires A, B, C, and D provide source and/or return paths for heating energy to the metal foil heater 170 as will become more evident from the following description.

In operation, ice is permitted to form on the small parting strip islands, but not in those areas on the metal foil surface 192 in between the islands which are not plated. Ice forms on these islands, (but on the front side of the leading edge) because the Nickel plating renders the Titanium metal lower in electrical resistance, so the Nickel plated island areas are cooler than the surrounding Titanium metal surfaces 192 between them, which is referred to as the "sea of heat". The island areas are designed in odd physical shapes, like those shown at 180, 182, 184 and 186, for example, to be aerodynamically asymmetrical so that drag forces from an aero slipstream may create a torque against each island and cause a twisting force and motion to occur against each island. This twisting motion aids in freeing the ice from the islands in the stagnation zone of the airfoil 10, where the air movement is difficult to harness for ice shedding purposes. While FIG. 12 shows only a few simple examples of asymmetrical parting strip island shapes, it is understood that there may be literally hundreds to thousands of possible different asymmetrical shapes that may be used just as well as those shown in FIG. 12. In addition, those skilled in the pertinent art will understand that different island shapes may be employed for different leading edge airfoils.

Pulsed heating energy may be applied via bus bars 188, 189, 190 and 191 in a controlled manner to the sea of heat area 192 to ensure that virtually no ice can form there. Preferably, sufficient power is pulsed to the sea of heat 192 to prevent icing altogether (i.e. anti-icing). Then, periodically, extra heating energy may be applied at a less frequent duty cycle to completely shed ice formed on the plated island surfaces. Accordingly, this parting strip embodiment will maintain the respective parting strip zone 176, 178 virtually free and clear of ice with substantially less average power and without the use of AOA information.

Figure 13:
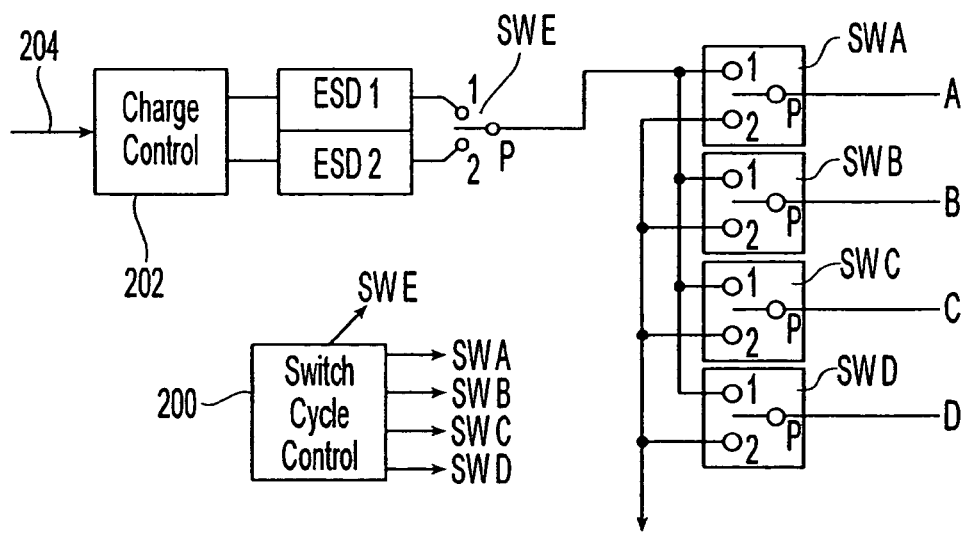
FIG. 13 is a block diagram schematic of an exemplary controller suitable for use in the embodiment of FIG. 12.

A block diagram schematic of an exemplary embodiment of control circuitry suitable for use in controlling the foregoing described sea of heat/island parting strip design is shown in FIG. 13. Referring to FIGS. 12 and 13, the pole contacts P of a plurality of switches SWA, SWB, SWC and SWD are connected to the conductor wires A, B, C and D, respectively. Switch contacts 1 of the switches SWA, SWB, SWC and SWD are commonly connected to a pole contact of another switch SWE. Switch contacts 2 of the switches SWA, SWB, SWC and SWD are commonly coupled to a common or ground potential of the system. A switch duty cycle controller 200 is coupled to the switches SWA, SWB, SWC, SWD and SWE and is operative to control the sequencing thereof in accordance with a predetermined sequence pattern as will become more evident from the following description. Switch contacts 1 and 2 of switch SWE are connected to the outputs of energy storage devices ESD1 and ESD2, respectively. ESD1 and ESD2 are charged to different voltage potentials under control of a charge control circuit 202 which receives electrical energy from a power source over bus 204. In the present embodiment, the ESD2 may be charged to a higher voltage potential than ESD1.

An exemplary operation of the embodiment of FIGS. 12 and 13 is as follows. The switch control circuit 200 commences a control sequence by controlling switches SWC and SWD to position 2, thereby grounding the bus bars 190 and 191 of the metal foil heater 170. Then, controller 200 may control SWE to position 1 and pulse switches SWA and SWB to position 1 for a duration sufficient to discharge the charge on ESD1 (heating energy) through the sea of heat area 192 of metal foil 170 via bus bars 188 and 189. Note that the conductors C and D via bus bars 190 and 192 form return paths for the metal foil heating energy through switches SWC and SWD to a ground or common potential of the power source. The heating energy of the discharged pulse should be sufficient to keep the sea of heat 192 virtually free of ice, but permit ice to form on the island surface areas, and on the surfaces of the top and bottom aft shedding areas 172 and 174 of the metal foil heater 170. Note that keeping the sea of heat 192 free of ice will cause ice to form around the leading edge 12 in a clam shell formation much the same as shown and described in connection with FIGS. 3 and 4 herein above.

Thereafter, controller 200 controls switches SWA and SWC to position 2, thereby grounding the bus bars 188 and 190. After allowing sufficient time for the ESD 1 to recharge to its voltage potential and ice to form to an allowable thickness on the aforementioned areas, the controller 200 may next pulse switch SWB to position 1 to discharge the ESD1 into the top clam shell area 172 to permit ice to be shed therefrom. Then, after allowing sufficient time for the ESD 1 to recharge to its voltage potential, the controller 200 may next pulse switch SWD to position 1 to discharge the ESD1 into the bottom clam shell area 174 to permit ice to be shed therefrom. Return paths for the heating energy of areas 172 and 174 are formed respectively through conductors A (bus bar 188) and C (bus bar 190) which are connected to ground potential via the switches SWA and SWC.

Then, controller 200 may control switches SWC and SWD to position 2, thereby grounding bus bars 190 and 191. Switch SWE may be controlled to position 2 to connect the ESD2 at a higher voltage potential to position 1 of the switches SWA-SWD. Then, controller 200 may pulse switches SWA and SWB to position 1 for a duration sufficient to discharge the charge on ESD2 through the sea of heat area 192 of metal foil 170 via bus bars 188 and 189. The heating energy of the discharged pulse from ESD2 includes more energy than the heating energy discharged from ESD1. The heating energy discharged into the sea of heat 192 from ESD2 should be sufficient to not only keep the sea of heat 192 virtually free of ice, but also permit ice to be shed from the island surface areas as well. Thereafter, controller 200 may return to the beginning of the control sequence and repeat the foregoing described steps.

It is understood that the last step in the sequence in which the controller discharges additional heating energy into the parting strip area 176, 178 utilizing ESD2 resulting in effective shedding of ice from an entire area that is near the stagnation line may be performed less frequently than the former steps. In addition, voltages or energy levels to which ESD1 and ESD2 are charged will depend on such parameters as the size of the airfoil, the thickness of the Titanium metal foil, and the thickness of the Nickel plating of the parting strip islands. In general, these parameters may be chosen in connection with working power source voltages that may range from 12V to 110V, AC or DC, for example. Moreover, while two ESDs are used in the present embodiment for producing the different heating energy levels, it is understood that there are other ways of producing these two heating energy levels. For example, one ESD may be used with taps for discharging energy at different levels therefrom. In some cases, heating energy may be pulsed directly from auxiliary power sources without the aid of any energy storage devices.

It is further understood by all those skilled in the pertinent art that the foregoing described of the embodiment of FIGS. 12 and 13 was presented merely by way of example and that there are many other control sequences that may be performed to achieve the same or similar functional results without deviating from the broad principles of the present invention. For example, conductors A and B may be grounded and conductors C and D pulsed to keep the parting strip area free of ice, and conductors B and D may be grounded and conductors A and C pulsed to shed ice from the top and bottom clam shell areas.

While the present invention has been described herein above in connection with a plurality of aspects and embodiments, it is understood that these aspects and embodiments were presented by way of example with no intention of limiting the invention. Accordingly, the present invention should not limited to any specific embodiment or aspect, but rather construed in breadth and broad scope in accordance with the recitation of the claims appended hereto.

What is claimed is:

1. An electro-thermal ice protection system for an airfoil comprising:
at least one metal foil heater including at least one integral parting strip and a metal foil distinct from said at least one parting strip, said at least one metal foil heater configurable to cover at least a portion of a leading edge of said airfoil with said at least one integral parting strip disposed along an air-stagnation zone of the leading edge and said metal foil extending on both sides of the parting strip, in a cross-sectional view of the airfoil; and
a controller coupled electrically to said at least one metal foil heater for controlling electrical energy from a power source to the metal foil of said heater in accordance with a first pulse duty-cycle and for controlling power to said parting strip of said heater to maintain said air-stagnation zone virtually free of ice formation; wherein:
the metal foil is exposed to the atmosphere.

2. The system of claim 1, wherein the heater includes an insulation layer bonded to a leading edge facing side of the metal foil of said heater for electrically and thermally isolating the metal foil from the airfoil.

3. The system of claim 2 wherein the at least one parting strip is embedded in the insulation layer.

4. The system of claim 1, wherein the metal foil of the heater comprises titanium.

5. The system of claim 1, comprising a plurality of parting strip segments, each parting strip segment disposed along a corresponding segment of an air-stagnation zone of the leading edge of said airfoil.

6. The system of claim 5, wherein the controller is operative to pulse heating energy from the power source sequentially through the plurality of parting strip segments.

7. The system of claim 6, further comprising:
an energy storage device corresponding to each parting strip segment of the plurality, each energy storage device chargeable from the power source; and
a switching arrangement corresponding to each parting strip segment for pulse discharging the corresponding energy storage device into the corresponding parting strip segment.

8. The system of claim 7, wherein the controller is operative to control the plurality of switching arrangements to sequentially pulse discharge each energy storage device of the plurality into the corresponding parting strip segment.

9. The system of claim 5, further comprising:
a common energy storage device chargeable from the power source; and
a switching arrangement for pulse discharging the common energy storage device into a selected one of the plurality of parting strip segments.

10. The system of claim 9, wherein the controller is operative to control the switching arrangement to pulse discharge the common energy storage device into one of the plurality of parting strip segments selected in accordance with a position of a stagnation line in the air stagnation zone.

11. The system of claim 9 wherein the controller is governed by an angle of attack signal to control the switching arrangement to pulse discharge the common energy storage device into the selected parting strip segment.

12. The system of claim 5, wherein each parting strip segment runs substantially parallel to the span of the leading edge of the airfoil.

13. The system of claim 5, wherein the heater includes an insulation layer bonded to a leading edge facing side of the metal foil of said heater for electrically and thermally isolating the metal foil from the airfoil; and wherein the plurality of parting strip segments are embedded in the insulation layer.

14. The system of claim 5, wherein the plurality of parting strip segments are disposed on an exposed surface of the metal foil of the heater and are electrically and thermally isolated therefrom.

15. The system of claim 1, wherein:
said at least one parting strip comprises a plurality of parting strip segments, each parting strip segment disposed along a corresponding segment of the air-stagnation zone; and
the controller is configured to selectively energize at least one of the parting strip segments based on information reflective of an angle of attack of the airfoil.

16. An electro-thermal ice protection system for an airfoil comprising:
at least one metal foil heater including at least one integral parting strip and a metal foil distinct from said at least one parting strip, said at least one metal foil heater configurable to cover at least a portion of a leading edge of said airfoil with said at least one integral parting strip disposed along an air-stagnation zone of the leading edge and said metal foil being exposed to the atmosphere; and
a controller coupled electrically to said at least one metal foil heater, the controller for controlling electrical energy from a power source to said parting strip of said heater in accordance with a first pulse duty-cycle and also for controlling electrical energy to said metal foil; wherein:
said at least one parting strip comprises a plurality of parting strip segments, each parting strip segment disposed along a corresponding segment of the air-stagnation zone; and
the controller is configured to selectively energize at least one of the parting strip segments based on information reflective of an angle of attack of the airfoil.

17. The system according to claim 16, wherein the metal foil extends on both sides of the at least one parting strip, in a cross-sectional view of the airfoil.

18. The system according to claim 17, wherein the controller is further configured to energize the metal foil of said foil heater in accordance with a second pulse duty cycle.

19. The system according to claim 18, wherein the first pulse duty cycle and the second pulse duty cycle differ from one another.

20. The system according to claim 17, wherein the plurality of parting strip segments are embedded in an insulation layer and electrically isolated from the metal foil.

21. The system according to claim 16, further comprising:
a common energy storage device chargeable from the power source; and
a switching arrangement for pulse discharging the common energy storage device into said at least one of the parting strip segments.

22. The system according to claim 16, wherein the controller selects said at least one of the parting strip segments in accordance with a position of a stagnation line in the air stagnation zone.

23. The system according to claim 16, wherein each parting strip segment runs substantially parallel to the leading edge of the airfoil.

* * * * *